United States Patent

[11] 3,586,135

| | | |
|---|---|---|
| [72] | Inventor | Fritz Ostwald<br>Buchschlag, Germany |
| [21] | Appl. No. | 821,853 |
| [22] | Filed | May 5, 1969 |
| [45] | Patented | June 22, 1971 |
| [73] | Assignee | International Telephone and Telegraph Corporation<br>New York, N.Y. |
| [32] | Priority | May 6, 1968 |
| [33] | | Germany |
| [31] | | P 17 50 478.8 |

[54] BRAKE SYSTEM WITH DRUM AND INTERIOR AND EXTERIOR SHOES AND AUTOMATIC ADJUSTING MEANS FOR HEATING AND WEAR
8 Claims, 3 Drawing Figs.

[52] U.S. Cl............................................ 188/76, 188/196
[51] Int. Cl......................................... F16d 53/00
[50] Field of Search............................. 188/76, 79.5 B, 196

[56] References Cited
UNITED STATES PATENTS

| | | | |
|---|---|---|---|
| 2,196,396 | 4/1940 | Lane............................. | 188/79.5 (B) |
| 3,357,525 | 12/1957 | Francois....................... | 188/76 |
| 3,388,776 | 6/1968 | Burnett......................... | 188/76 |
| 3,481,433 | 12/1969 | Lepelletier................... | 188/76 X |

*Primary Examiner*—Duane A. Reger
*Attorneys*—C. Cornell Remsen, Jr., Walter J. Baum, Paul W. Hemminger, Percy P. Lantzy and Thomas E. Kristofferson ABSTRACT: A drum-braking system, particularly applicable to vehicular use, and having both external and internal shoes is shown. A carrier assembly on which actuators for both shoes are mounted, is itself mounted with a small amount of radial translational freedom with respect to an axle or steering knuckle. Movement within that freedom is controlled by a bimetal strip which is placed so as to be heated by the drum. A spring loop connects the bimetal strip to the carrier and acts to restore the external shoe clearance after drum cooling; the heating action having acted to adapt the external shoe clearance to heat induced drum distortion. The characteristics of the spring loop are such that the spring will deform partially plastically when its deflection is relatively great during heating because the brake linings have been allowed to wear beyond a predetermined amount. Thus adjustment for lining wear is combined in the structure for adjusting to heat-induced temporary drum distortions.

INVENTOR
FRITZ OSTWALD

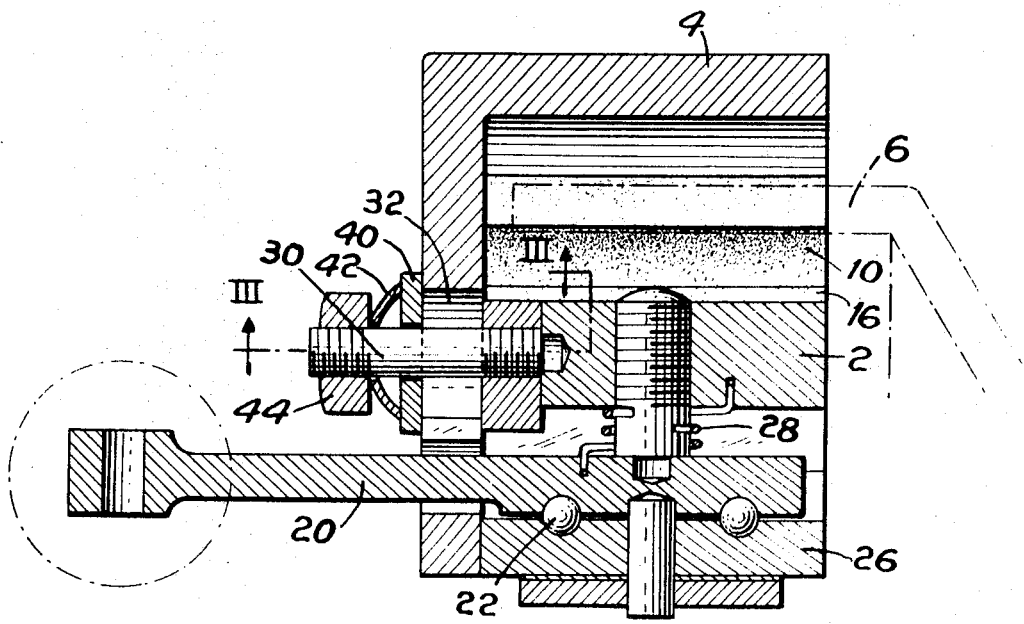
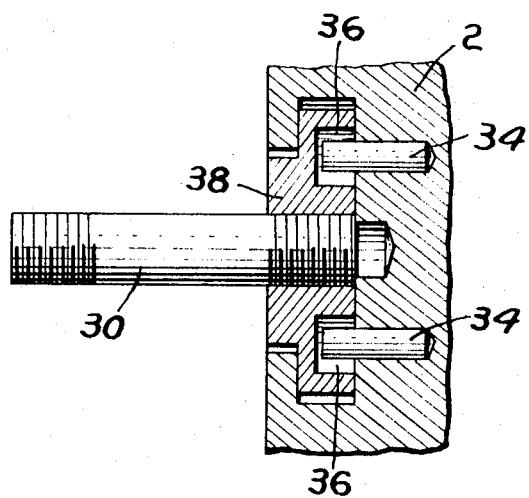

3,586,135

BRAKE SYSTEM WITH DRUM AND INTERIOR AND EXTERIOR SHOES AND AUTOMATIC ADJUSTING MEANS FOR HEATING AND WEAR

CROSS REFERENCE TO RELATED APPLICATIONS

This application is filed under the provisions of 35 U.S.C. 119 with claim for the benefit of the filing of an application covering the same invention filed May 6, 1968, P 17 50 478.8, in the Federal Republic of Germany.

BACKGROUND OF THE INVENTION

1. Field of the Invention

The present invention relates to braking systems for inhibiting rotational motion. More particularly, the present invention relates to automatic adjustment devices for drum and shoe brakes having at least an external shoe, to compensate for heat induced temporary drum distortion and also for excessive external lining wear.

2. Description of the Prior Art

In the prior art the general configuration of drum and shoe brakes is well known. Systems applying shoe-braking pressure to both inner and outer drum surfaces are also well known. Such double-acting brake systems, while powerful in their response, tend to heat their drums more than many less effective arrangements. Such heating is inherent in the physics of dissipating the kinetic energy of rotary motion, or of vehicular forward motion converted to rotary wheel motion.

It is known that distortion, particularly circumferential (and consequently radial) drum surface expansion, is an inevitable consequence of brake heating. In common interior shoe systems this expansion does not require compensation of lining quiescent clearances, however, an exterior shoe must be controlled automatically to maintain the proper spacing with the distorted drum. The manner in which the unique structure of the present invention solves this problem will be apparent as this specification proceeds.

SUMMARY OF THE INVENTION

In view of the aforementioned problem caused by drum heating in a brake system having at least an external shoe acting on the outer periphery of said drum, the present invention had as an achieved objective, the development of inexpensive, easily manufactured, automatic adjusting structure for adjusting at least the said external shoe drum clearance in response to said drum heating.

The structure of the invention includes a brake shoe carrier which supports the actuating mechanism, linings, etc., for both the internal and external shoes. The carrier is mounted so as to allow a small radial translational movement, but substantially no tilting or tangential motion, in order to afford shoe-to-drum clearance adjustment without deteriorating the parallelness of the lining to drum contact.

A heat sensitive device, such as the illustrated bimetal strip is located close to the drum so as to be heated by radiation from the drum. One end is anchored with respect to the shaft or steering knuckle of the wheel and the other is free to deflect as a function of temperature. The said free end is connected so as to produce a corresponding radial adjustment of the carrier and consequently an outward adjustment of the shoes.

The heat-induced drum distortion may be thought of as tending to temporarily increase the diameter of the drum, requiring the said outward radial shoe adjustment. As the drum is cooled, the shoe clearance adjustment is reciprocally returned to its quiescent condition.

The linkage connecting the free end of the bimetal strip to the carrier is mainly a flat spring strip making essentially a 180° loop laterally (referenced to a direct line of connection between the bimetal strip and the shoe carrier). Normally, this spring loop is elastically stressed in a manner such as to cause partial closure of said loop. However, in the case of excessively worn linings, the combination of normal braking action and full deflection of the heat sensitive bimetal strip stresses the spring loop beyond its elastic limit, resulting in some degree of plastic deformation (permanent set). The said spring loop is designed and its material and heat treat condition are selected so that this point of plastic deformation is predictable.

Thus, a simple, economical and easily manufactured structure in accordance with the invention, provides not only drum-heating compensation but also lining wear compensation in a system of the character described and illustrated.

The spring loop may be considered expendable and may be replaced when overworn linings are replaced.

BRIEF DESCRIPTION OF THE DRAWINGS

FIG. 2 is a view taken along the line 2-2 of FIG. 1; and

FIG. 3 is a view taken along line 3-3 of FIG. 2.

DESCRIPTION OF THE PREFERRED EMBODIMENTS

Figure 1:
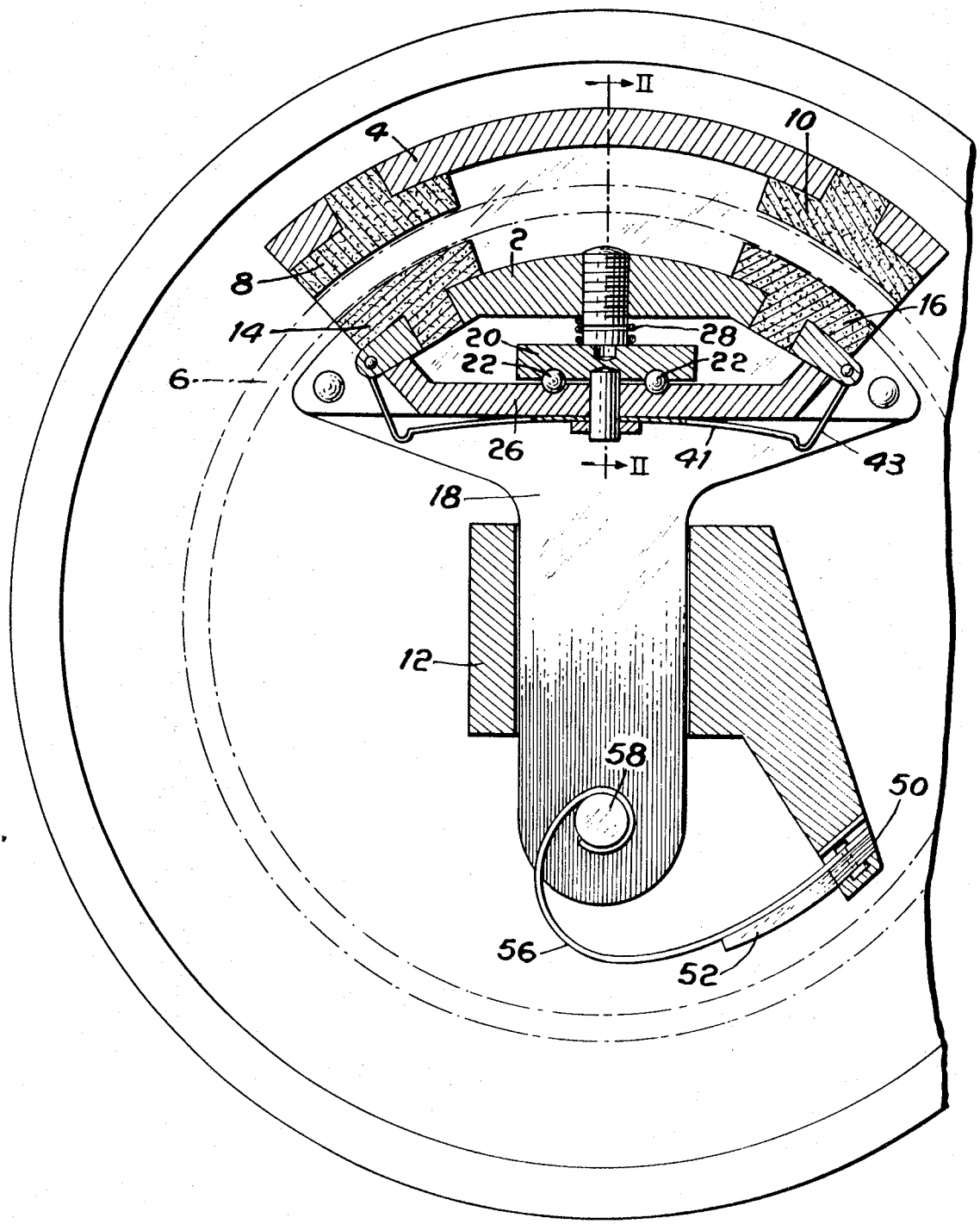
FIG. 1 is a cross-sectional plane view of a brake embodying the present invention.

Referring to the figures there is shown an automotive wheel brake having an internal brake shoe 2 and an external brake shoe 4, adapted to move toward each other and grip the brake drum 6.

The external brakeshoe 4 having brake pads 8 and 10 is rigidly attached to a brake carrier 18 which is radially movable in the support and guide members 12, while the inner brakeshoe having brake pads 14 and 16 is mounted for radial movement with respect to the brakeshoe carrier 18 as described hereinbelow. The support and guide member 12 is rigidly attached to the nonrotating axle or other fixed support member on the vehicle.

The brake-actuating mechanism is a mechanical lever operated device having known ball and ramp cam arrangements for forcing the brakeshoes toward each other so that they grip the brake drum 6. Although a mechanical actuator is shown various other actuators could be utilized. As noted above, the inner brake shoe 2 is radially movable with respect to the outer brakeshoe 4 and brake carrier 18, while the integral outer brakeshoe 4 and carrier 18 are radially movable with respect to the fixed support member 12. The actuator mechanism is controlled by a lever 20 which cooperates with balls 22 on an inclined ramp to force the inner brakeshoe 2 outward. The reaction force is transmitted to the outer brakeshoe 4 by the structural support section 26 which supports the actuator mechanism and is attached to the carrier 18. An automatic adjusting device 28 is arranged in the actuator mechanism to provide the required clearance after braking. The inner brake shoe is mounted on the brake carrier 18 by means of a bolt 30 which is movable in a radial slot 32 in the carrier 18. The bolt and inner brakeshoe are held in position by the plate 40, spring washer 42 and nut 44. As shown in FIG. 3, pins 34 attached to the inner brake shoe extend into the bores 36 of guide member 38 with a clearance which is equal to the desired brake clearance. As the brake pads wear out the guide member 38 moves toward the drum along with the inner brakeshoe 2 and bolt 30. In this way the inner brakeshoe is supported while being free to move toward the brakedrum 6.

A retaining spring 41 having arms 43 is attached at its center to the structural support section member 26 while its outer ends act against the inner brakeshoe to provide a restoring force.

As noted above the brake carrier 18 and external brakeshoe 4 are guided for movement in a radial direction by the support and guide member 12. A subassembly characterized as a carrier-positioning means is affixed to the fixed support 12 and guide member at 50. This subassembly includes a bimetallic strip 52 attached at its end to the support and guide member 12. An adjusting spring 56 extends between the other end of the bimetallic strip and a pin 58 on the end of the carrier 18. The bimetallic strip is arranged close to the drum and within the radiant heat from the drum. Although the spring is shown with the bimetallic strip 52, the bimetallic strip could be connected directly between the fixed support member 12 and the brake carrier 18.

The bimetallic strip 52 is arranged so that when the brakedrum 6 is heated during braking the bimetallic strip distorts whereby the external shoe accommodates itself to the distortions of the brakedrum. When the brakedrum cools off the reverse process occurs and the bimetallic strip returns the brake carrier to its normal position. The combination of the bimetallic strip and the spring 56 ensures a relatively constant clearance between the drum 6 and the external brakeshoe 4.

Under normal brake operation the adjusting spring 56 functions within its elastic limit and resumes its original shape after braking thereby maintaining the desired brake clearance. As the brake linings wear out, the elastic range of the spring is exceeded and the spring 56, which is in the form of a loop, becomes permanently distorted to some extent. This distortion tends to bring the external brakeshoe inward to compensate for the brake pad wear.

What I claim is:

1. A drum and shoe-type system for braking rotational motion in which a first brakeshoe operates against the outer drum periphery and a second brakeshoe contemporaneously operates against the inside drum surface;

comprising a brakeshoe carrier from which support and actuating mechanisms for both of said first and second brakeshoes are mounted;

slidable mounting means for mounting said brakeshoe carrier, said slidable mounting means permitting radial translational motion but substantially no rotational motion of said carrier with respect to a predetermined first point in fixed relationship with the axis of said drum;

carrier-positioning means including a bimetal strip anchored at one end to a second point in fixed relationship with said predetermined first point, and connected at its other end through a mechanical linkage to said carrier, said bimetal strip being located so as to receive radiant heat from said drum, thereby to adjust the radial relationship of said brakeshoes with respect to said drum in response to operational heating of said drum.

2. The invention set forth in claim 1 further defined in that said drum and shoe-braking system are applied at least to the front wheels of a motor vehicle, and said predetermined first point is associated with the steering knuckle of the corresponding one of said front wheels.

3. The invention set forth in claim 1 further defined in that said bimetal strip is adjacent to a portion of the surface of said drum substantially removed from the location of said first and second brakeshoes.

4. The invention set forth in claim 1 further defined in that said bimetal strip is adjacent to a portion of the inside surface of said drum within the drum half-arc opposite the half-arc in which said first and second brakeshoes are operative.

5. The invention set forth in claim 4 in which said bimetal strip is arcuate and lies substantially parallel to, and close spaced from, said inside surface of said drum, when said drum is not substantially heated.

6. The invention set forth in claim 5 in which said bimetal strip is defined as adapted to bend toward the axis of said drum under heating influence of said radiant heat.

7. The invention set forth in claim 6 further defined in that said mechanical linkage comprises a loop of resilient material which connects said carrier to said bimetal strip, said loop being adapted to convert the force of the heat-induced deformation of said bimetal strip at least partly into said radial translational motion, the remainder of said force being stored in elastic deformation of said loop so long as the linings of said shoes are not worn beyond a predetermined amount.

8. The invention set forth in claim 7, further defined in that said loop is adapted to exceed its resilient limit and therefore to deform partly plastically during the condition of braking and substantial drum heating when said linings are worn beyond said predetermined amount, thereby to automatically adjust the lining clearance of said first brakeshoe for the excessive lining wear condition.